(12) United States Patent
Laubinger et al.

(10) Patent No.: US 8,044,781 B2
(45) Date of Patent: Oct. 25, 2011

(54) SYSTEM AND METHOD FOR DISPLAYING A 3D VEHICLE SURROUNDING WITH ADJUSTABLE POINT OF VIEW INCLUDING A DISTANCE SENSOR

(75) Inventors: Lorenz Laubinger, San Francisco, CA (US); Jamie Camhi, Pacifica, CA (US)

(73) Assignee: Volkswagen AG, Wolfsburg (DE)

( * ) Notice: Subject to any disclaimer, the term of this patent is extended or adjusted under 35 U.S.C. 154(b) by 519 days.

(21) Appl. No.: 12/268,299

(22) Filed: Nov. 10, 2008

(65) Prior Publication Data

US 2010/0117812 A1   May 13, 2010

(51) Int. Cl.
*G08B 21/00* (2006.01)
(52) U.S. Cl. ......... 340/435; 340/436; 701/207; 701/301
(58) Field of Classification Search .................. 340/435, 340/436, 903; 701/1, 207.3, 301
See application file for complete search history.

(56) References Cited

U.S. PATENT DOCUMENTS

| | | |
|---|---|---|
| 2002/0181803 A1 | 12/2002 | Kawakami et al. |
| 2003/0035050 A1 | 2/2003 | Mizusawa et al. |
| 2003/0088361 A1 | 5/2003 | Sekuguchi |
| 2006/0088190 A1 | 4/2006 | Chinomi |
| 2007/0003108 A1 | 1/2007 | Chinomi et al. |

FOREIGN PATENT DOCUMENTS

| | | |
|---|---|---|
| DE | 31 06 100 | 9/1982 |
| DE | 10 2005 002 636 | 8/2006 |
| JP | 2001-224013 | 8/2001 |
| JP | 2004-274114 | 9/2004 |

*Primary Examiner* — Jeffery Hofsass
(74) *Attorney, Agent, or Firm* — Kenyon & Kenyon LLP (57) ABSTRACT

A system and method relates to displaying a vehicle surrounding with an adjustable point of view, including at least one sensor device on the vehicle, a processor, and a display. The sensor device is configured to measure distances to objects of the vehicle surrounding. In addition, the processor is configured to generate a three-dimensional environment map based on the measured distances of the sensor device. Further, the display is configured to display the three-dimensional environment map having an adjustable point of view based on a particular driving situation.

27 Claims, 7 Drawing Sheets

SYSTEM AND METHOD FOR DISPLAYING A 3D VEHICLE SURROUNDING WITH ADJUSTABLE POINT OF VIEW INCLUDING A DISTANCE SENSOR

FIELD OF THE INVENTION

The present invention relates to a system and method for displaying a vehicle surrounding with an adjustable point of view.

BACKGROUND INFORMATION

A vehicle generally has a number of zones around the vehicle that are not visible to a driver either by direct line of sight or by the use of mirrors. During various driving situations, however, it may be necessary for a driver to view these zones in order to identify potential obstructions or obstacles, such as other vehicles, pedestrians, street signs or posts, and many other possible obstructions or obstacles.

In order to improve the visibility of particular zones around the vehicle, one or more cameras may be installed in order to view the vehicle surrounding. The images captured by the cameras of these systems are typically viewable on a display installed in the instrument panel of the vehicle. Then, the driver may have a better understanding of zones around the vehicle that are hidden from direct view or view by the use of mirrors.

Figure 2:
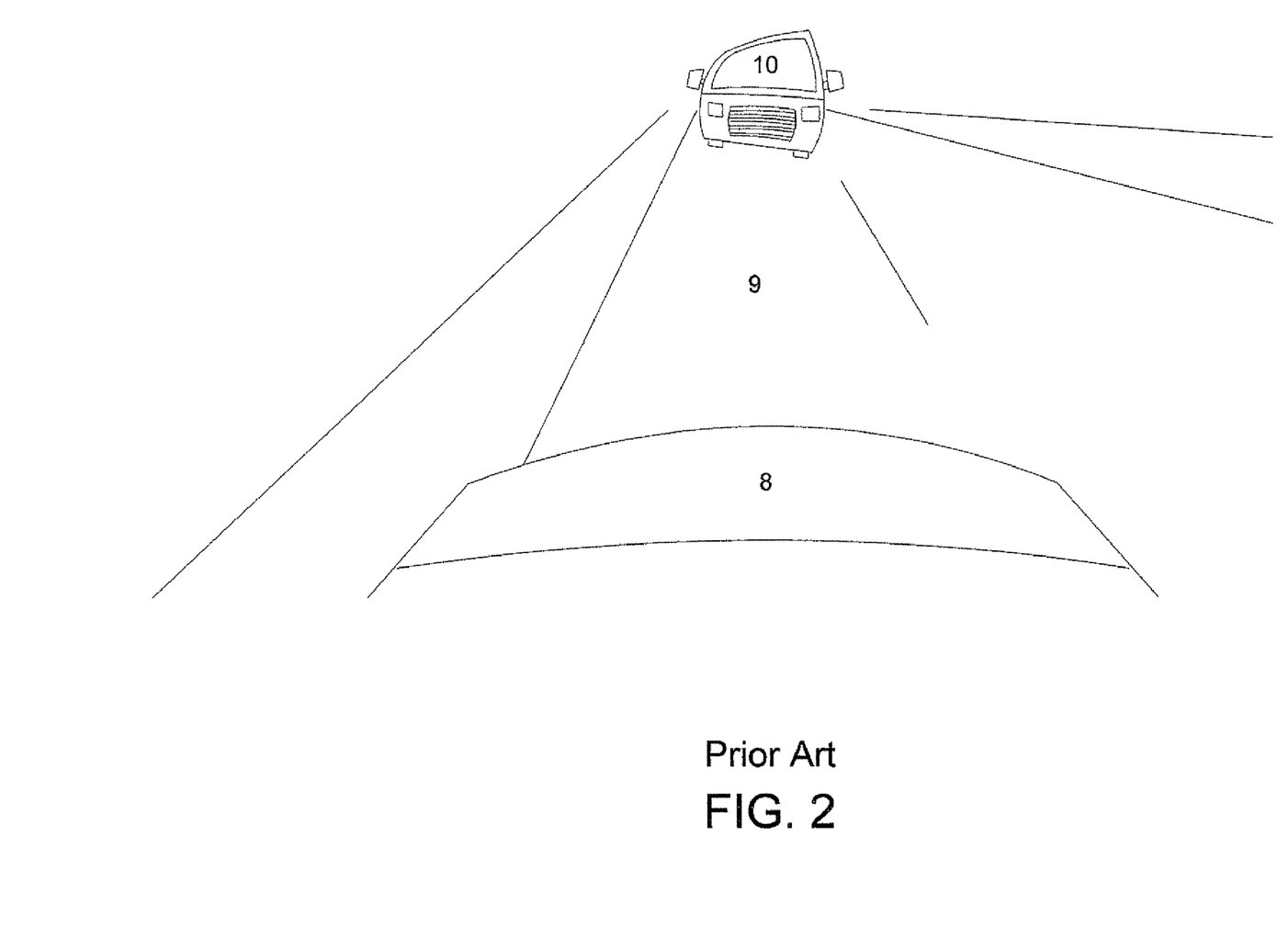
FIG. 2 is a representative view of a typical point of view from a rear view camera system.

Often, however, the images captured by the cameras of these systems have an unnatural appearance that may be difficult for a driver to understand. For example, cameras installed around a vehicle may utilize wide angle optics. Although these wide angle optics may allow the cameras to capture a larger area of the vehicle surrounding, they may also create distortion in the images. Thus, a driver may have difficulty understanding the vehicle surrounding or judging distances to objects in the images of the vehicle surrounding because of the distortion. For example, FIG. 2 shows a representative drawing of a typical point of view from a rear view camera system using wide angle optics while driving a driven vehicle 8 on a roadway 9. As can be seen from FIG. 2, the image of the rear view shows the roadway 9 and a following vehicle 10 behind the driven vehicle 8. However, this image is highly distorted, making it difficult to accurately judge distances to objects within the image.

In addition, cameras may be mounted at locations around the vehicle that are not intuitive to a driver. Thus, a driver may have difficulty understanding the perspective of the images or judging distances to objects in the images of the vehicle surrounding because of the unexpected mounting locations of the cameras.

For example, when reversing into a parking spot, a driver viewing an image from a rearward facing camera using wide angle optics may have difficulty understanding the perspective of the image or judging the distances to obstacles, such as pillars, other vehicles, and curbs, due to distortion and/or unexpected mounting locations of the cameras.

Figure 3:
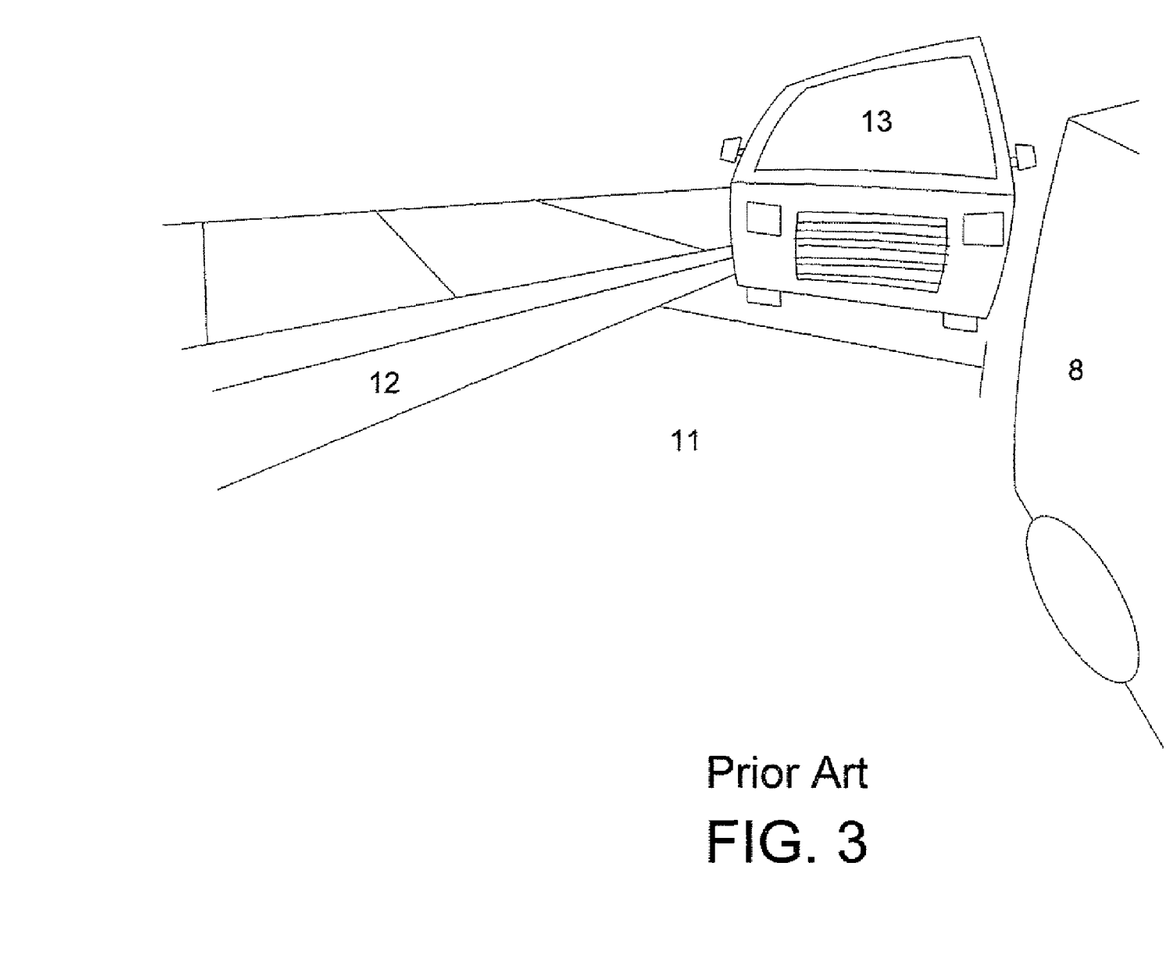
FIG. 3 is a representative view of a typical point of view from a side view camera system.

Further, FIG. 3 shows a representative drawing of a typical point of view from a side view camera system using wide angle optics while performing a parallel parking operation of a driven vehicle 8. As can be seen from FIG. 3, the image of the side view shows a parallel parking spot 11, a sidewalk curb 12, and a parked vehicle 13 behind the driven vehicle 8. However, this image is highly distorted, making it difficult to accurately judge distances to objects within the image.

In order to minimize the effects of unusual points of view, systems having cameras may also include sensors installed in various locations. These sensors may provide additional information to aid a driver in understanding the images captured by the cameras. For example, the additional sensors may measure distances to objects in the captured images.

Other systems may utilize cameras with wide angle optics but display only portions of the images to reduce the confusing effects of wide angle fields of view. In addition, some systems may indicate to a driver the measured distances graphically and numerically, such as by the use of labeled graphic lines superimposed on the images, so that a driver may better judge distances to objects in the images.

Japanese Published Patent Application No. 2001-224013 describes a drive support system that visually displays distance information between a vehicle and an obstacle. The visual display may be from a manually-specified perspective to easily view the relative positions of the vehicle and the obstacle. In addition, the obstacle may be color-coded based on the distance to the vehicle, in order to further visually display the distance information.

German Published Patent Application No. 10 2005 002 636 describes a system that combines video data and distance data by a coordinate transformation from a camera coordinate system to a distance coordinate system, such that the video data and distance data are aligned in a single coordinate system.

U.S. Patent Application Publication No. 2003/0088361 describes a system including an image-measured distance detection device for detecting distance data, and a laser-measured distance detection device for detecting distance data. In addition, a three-dimensional object recognition means recognizes an object in front of the vehicle based on the distance data from both the image-measured distance detection device and the laser-measured distance detection device.

German Published Patent Application No. 31 06 100 describes an obstacle warning device in which the obstacles are color coded depending upon the obstacle distance or obstacle speed.

U.S. Patent Application Publication No. 2003/0035050 describes a driving assistance display apparatus for displaying an image from a wide angle camera on a single screen so that a driver can intuitively understand the image. In this regard, the display apparatus splits the single screen into a plurality of sub-screens corresponding to inner faces of a polyhedron.

U.S. Patent Application Publication No. 2002/0181803 describes a perspective projection image creation system including an optical system, an imaging section, an image transformation section, a scale model creation section, an image combining section, and a display section. In addition, the image transformation section transforms the image data to a perspective projection having a projection center at a focal point of a hyperboloidal mirror of the optical system. Further, a first omnidirectional vision sensor is positioned at the right front of the car, and a second omnidirectional vision sensor is positioned at the left rear of the car.

U.S. Patent Application Publication No. 2006/0088190 describes a driving support system including a plurality of image taking devices that take images of areas around a vehicle. Then, an image processing unit performs a predetermined coordinate transformation to produce a virtual image viewed from a virtual viewpoint.

U.S. Patent Application Publication No. 2007/0003108 describes an image display device having plural cameras for capturing plural images. Then, the image display device forms a bird's eye view showing the vehicle surroundings. Further, a driver may select a view of one of the plural cameras. In addition, a contactable region may be flickered or highlighted based on the distance or approaching speed of the obstacle.

Japanese Published Patent Application No. 2004-274114 describes an image display apparatus that displays a viewpoint-converted image. The apparatus may also display a warning line, or other alarm display, based on a distance to an obstacle.

SUMMARY

Example embodiments of the present invention provide a system and method for displaying a vehicle surrounding with an adjustable point of view, in order to show a point of view that is most beneficial to a particular driving situation.

According to example embodiments of the present invention, a system for displaying a vehicle surrounding with an adjustable point of view is provided, which includes at least one sensor device on the vehicle, the at least one sensor device configured to measure distances to objects of the vehicle surrounding; a processor configured to generate a three-dimensional environment map based on the measured distances of the at least one sensor device; and a display configured to display the three-dimensional environment map having an adjustable point of view based on a particular driving situation.

The adjustable point of view may be a point of view other than that of the at least one sensor device. Further, the adjustable point of view may be a point of view most beneficial to the particular driving situation. For example, during a parallel parking situation, the point of view most beneficial to the particular driving situation may be a point of view from at least one of a side and a rear of the vehicle.

The at least one sensor device may include at least one of a time-of-flight, lidar, radar, ultrasound, and stereo sensor device. In addition, the at least one sensor device may include a plurality of sensor devices with at least partially overlapping fields of view. Further, the plurality of sensor devices may include one sensor device mounted on a rear of the vehicle, and one sensor device mounted on each side of the vehicle.

The processor may be configured to continuously update the three-dimensional environment map. In addition, the processor may be configured to highlight the objects in the three-dimensional environment map based on the measured distances to the objects. Further, the processor may be configured to highlight the objects in the three-dimensional environment map based on the particular driving situation.

Moreover, the processor may be configured to perform sensor fusion, object recognition, and scene rendering. In addition, the processor may be configured to perform noise filtering and contrast enhancement. Further, the processor may be configured to include a three-dimensional model of the vehicle in the three-dimensional environment map.

The display may be configured to display an indication of the measured distances to the objects on the three-dimensional environment map.

The features of a method for displaying a vehicle surrounding with an adjustable point of view may have similar advantages as the features of the system for displaying a vehicle surrounding with an adjustable point of view.

According to example embodiments of the present invention, a method for displaying a vehicle surrounding with an adjustable point of view includes: measuring distances, by at least one sensor device on the vehicle, to objects of the vehicle surrounding; generating, by a processor, a three-dimensional environment map based on the measured distances of the at least one sensor device; and displaying, by a display, the three-dimensional environment map having an adjustable point of view based on a particular driving situation.

The method may further include measuring distances by a plurality of sensor devices with at least partially overlapping fields of view. In addition, the method may include measuring distances by the plurality of sensor devices including one sensor device mounted on a rear of the vehicle, and one sensor device mounted on each side of the vehicle.

The method may further include continuously updating, by the processor, the three-dimensional environment map. In addition, the method may include highlighting, by the processor, the objects in the three-dimensional environment map based on the measured distances to the objects. Further, the method may include highlighting, by the processor, the objects in the three-dimensional environment map based on the particular driving situation.

The generating of a three-dimensional environment map may further include combining, by the processor, the measured distances of the at least one sensor device; recognizing the objects in a data set; and rendering the three-dimensional environment map. In addition, the generating of a three-dimensional environment map may include: filtering noise; and enhancing contrast. Further, the method may include including, by the processor, a three-dimensional model of the vehicle in the three-dimensional environment map.

The displaying of the three-dimensional environment map may further include displaying from a point of view other than that of the at least one sensor device. Further, the displaying of the three-dimensional environment map may include displaying from a point of view most beneficial to the particular driving situation. For example, during a parallel parking situation, the step of displaying from the point of view most beneficial to the particular driving situation may include displaying from a point of view from at least one of a side and a rear of the vehicle.

The method may further include displaying, by the display, an indication of the measured distances to the objects on the three-dimensional environment map.

Example embodiments of the present invention are explained in greater detail in the following text with reference to the appended Figures.

DETAILED DESCRIPTION

Figure 1:
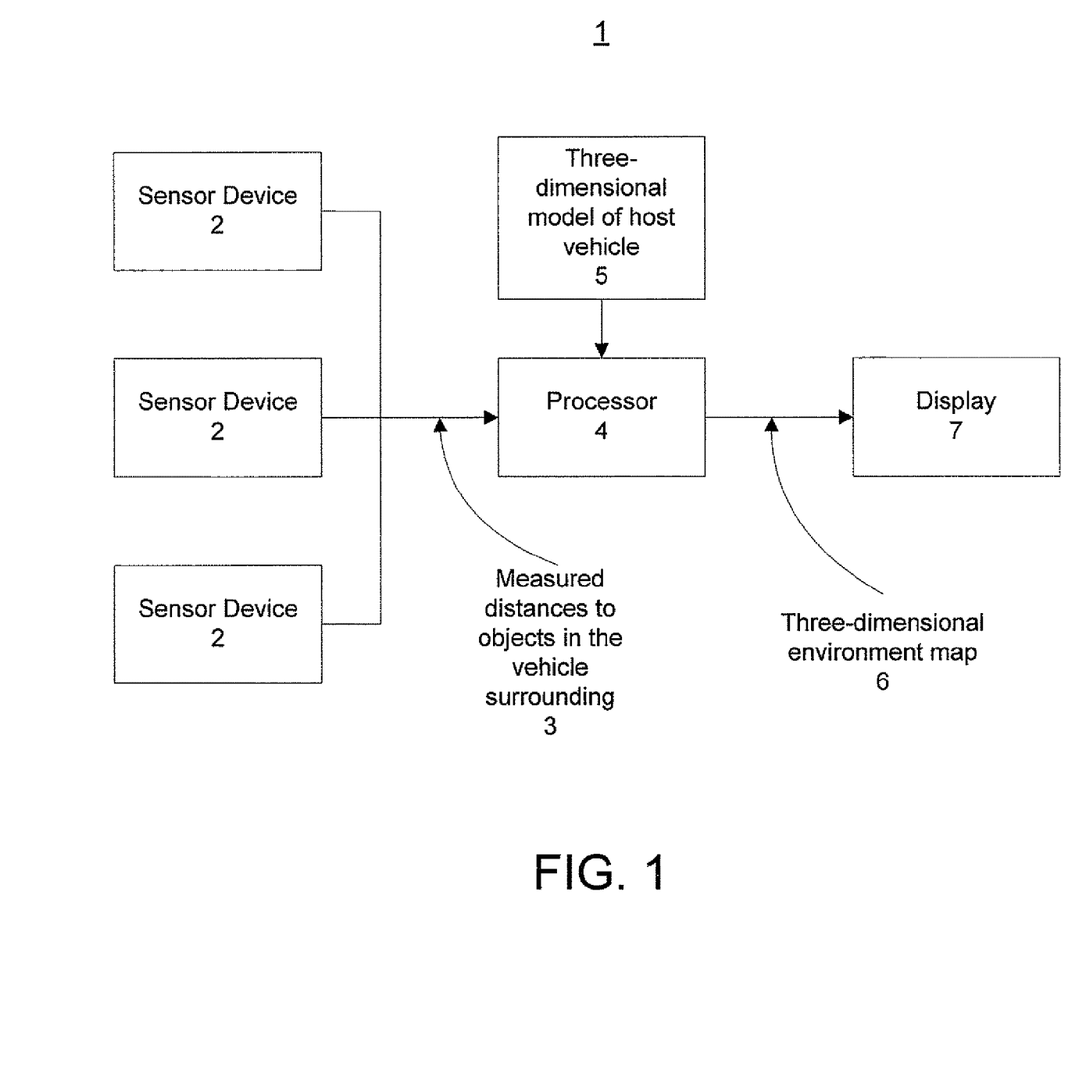
FIG. 1 is a schematic view of a system for displaying a vehicle surrounding with an adjustable point of view.

FIG. 1 shows a schematic block diagram of a system 1 for displaying a vehicle surrounding with an adjustable point of view.

The system 1 may include one or more sensor devices 2, a processor 4, and a display 7. As an example, FIG. 1 includes three sensor devices 2. In addition, a three-dimensional model 5 of the vehicle may be provided to the processor 4.

The sensor devices 2 measure distances to objects in the vehicle surrounding. The sensor devices 2 may include many different types of cameras and sensors, such as a three-dimensional camera that is based on the time of flight measurement principle, lidar, radar, ultrasound, stereo, and other cameras and sensors, etc. The sensor devices 2 provide to the processor 4 the data including measured distances 3 to objects in the vehicle surrounding.

The processor 4 then generates a three-dimensional environment map 6 from the measured distances 3 of the sensor devices 2. In order to generate the three-dimensional environment map 6, the processor 4 may perform sensor fusion, object recognition, and scene rendering. Additional processing may also be included, such as noise filtering and contrast enhancement, for example.

When performing sensor fusion, the processor 4 may combine the measured distances 3 from a plurality of sensor devices 2 into a single set of data. This process is analogous to stitching together multiple photographs into a single panoramic view, except that the processor 4 of this system 1 combines data of the three-dimensional measured distances 3. During sensor fusion, the processor 4 may also take into consideration the geometries of the fields of view 14 (see, e.g., FIG. 6) of the sensor devices 2, the mounting positions of the sensor devices 2, the orientation of the sensor devices 2, and other factors.

When performing object recognition, the processor 4 may identify objects of interest in the fields of view 14 by comparing them to a data set of potential objects of interest. The data set may include any of the various objects with which a vehicle may come into contact, such as other vehicles, pedestrians, street signs, light posts, fire hydrants, curbs, speed bumps, and many others, etc. Through the use of object recognition, the processor 4 may determine which objects to render for view in the three-dimensional environment map 6. Further, the processor 4 may determine which objects to possibly highlight based on the particular driving situation.

As the vehicle moves and/or as objects in the vehicle surrounding move, the processor 4 may continuously update the three-dimensional environment map 6. Further, the processor 4 may include a three-dimensional model 5 of the host vehicle, i.e., the vehicle in which the system 1 is installed, in the three-dimensional environment map 6. This may allow the host vehicle to be rendered together with the vehicle surrounding in those views that may be directed towards the host vehicle, thereby assisting a driver in understanding the three-dimensional environment map 6. Preferably, the three-dimensional model 5 of the host vehicle may be specific to the particular design of the host vehicle.

The display 7 outputs the three-dimensional environment map 6 for a driver to view the vehicle surrounding. In addition, the display 7 may include an indication of the measured distances 3 to objects in the three-dimensional environment map 6. The display 7 may be any type of display, such as, for example, a display from a conventional rear view camera (CMOS) system.

By this system 1, the vehicle surrounding of a host vehicle may be displayed as a three-dimensional environment map 6 on a display 7 from points of view other than that of any single camera or sensor device 2. The particular point of view in which an image is displayed may significantly assist a driver in correctly interpreting the vehicle surrounding, especially with respect to correctly judging distances to objects in the vehicle surrounding. By this system 1, the vehicle surrounding may be displayed from a point of view that is most beneficial to a particular driving situation.

Figure 4:
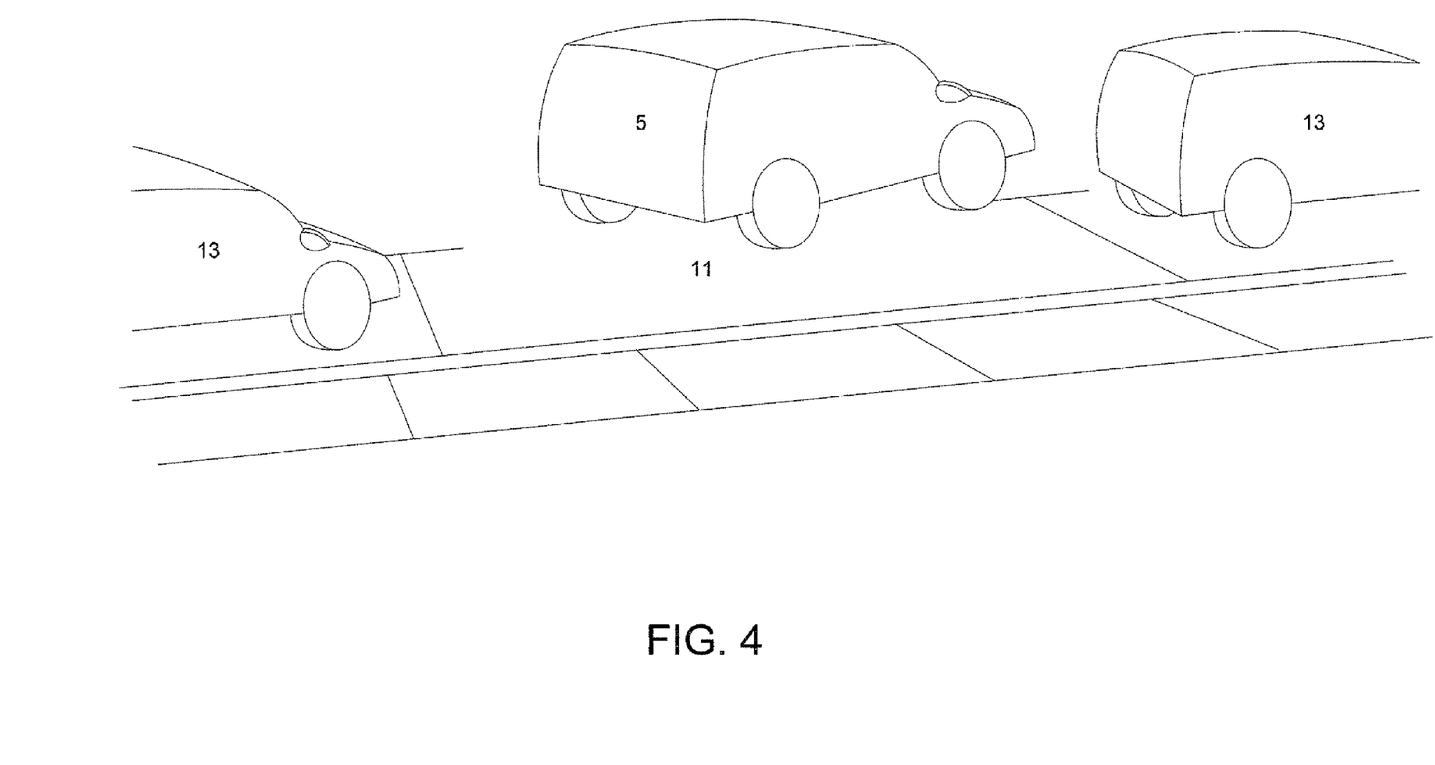
FIG. 4 illustrates an example embodiment of a rear/side point of view displayed from a three-dimensional environment map.

For example, as shown in the example embodiment of FIG. 4, during a parallel parking maneuver, the three-dimensional environment map 6 may be displayed from the perspective of an individual standing to the rear and to the side of the host vehicle, facing the host vehicle. In FIG. 4, the host vehicle is represented by the three-dimensional model 5 of the host vehicle. In addition, from the point of view shown in FIG. 4, parked vehicles 13 on either side of the parking spot 11 are also visible, further assisting a driver during a parallel parking maneuver.

Figure 5:
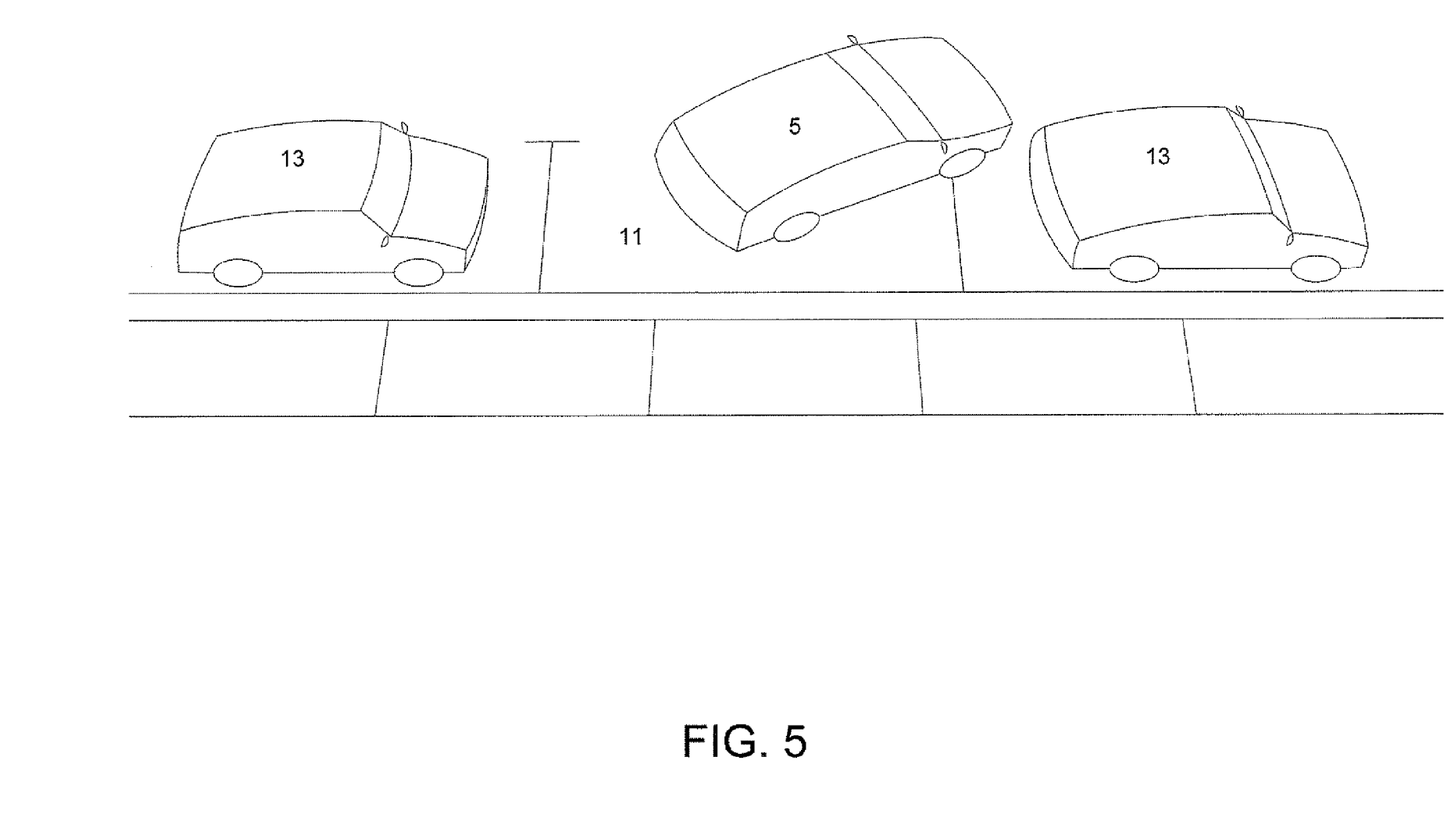
FIG. 5 illustrates an example embodiment of a bird's point of view displayed from a three-dimensional environment map.

Similar to FIG. 4, as shown in the example embodiment of FIG. 5, during a parallel parking maneuver, the three-dimensional environment map 6 may be displayed from a bird's view perspective of the host vehicle, looking down at the host vehicle. In FIG. 5, the host vehicle is also represented by the three-dimensional model 5 of the host vehicle. In addition, from the point of view shown in FIG. 5, parked vehicles 13 on either side of the parking spot 11 are also visible, further assisting a driver during a parallel parking maneuver.

Further, the three-dimensional environment map 6 may also include highlighting of objects of particular interest in the vehicle surrounding. The highlighting may be based on the measured distances 3 to the objects. More preferably, the highlighting may be based on a particular driving situation. Thus, the processor 4 may highlight those objects of particular interest in the three-dimensional environment map 6 of the vehicle surrounding which are relevant to the present particular driving situation, further assisting a driver during the particular driving situation.

Figure 6:
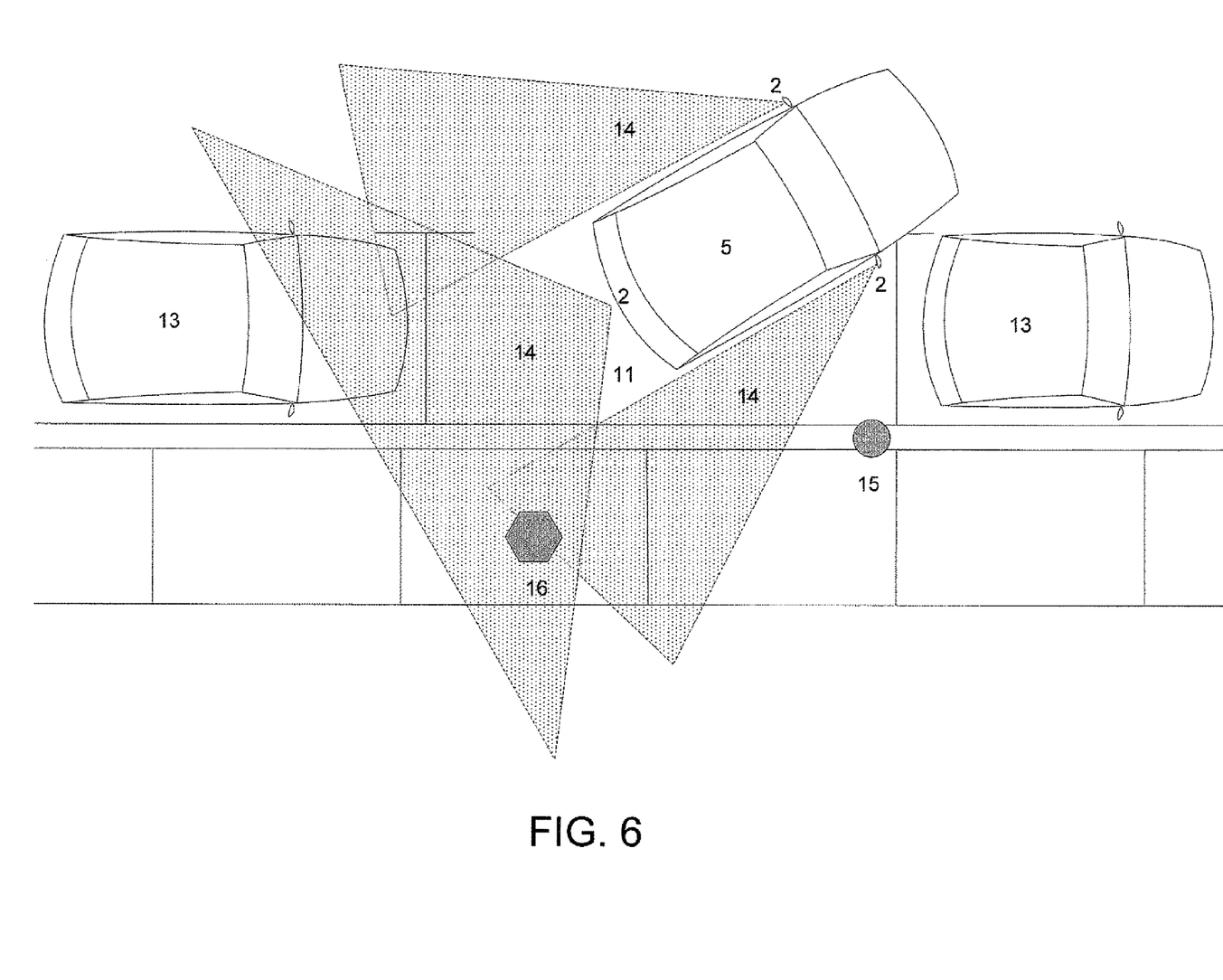
FIG. 6 is a schematic view of a top view of a vehicle having a system for displaying a vehicle surrounding with an adjustable point of view.

FIG. 6 shows a schematic diagram of a top view of a host vehicle 5 having a system 1 for displaying a vehicle surrounding with an adjustable point of view. As shown, the host vehicle 5 is performing a parallel parking maneuver. Therefore, for this schematic diagram, the viewing area of interest may include the area behind the host vehicle 5 extending rearward from the rear bumper for a distance, such as a few meters, for example. In addition, the viewing area of interest may also include the areas on both sides of the host vehicle 5 extending rearward beyond the rear bumper.

The host vehicle 5 shown in FIG. 6 includes a system 1 having a plurality of sensor devices 2. For example, one sensor device 2 is located at a rear of the host vehicle 5, and one sensor device 2 is located on each side of the host vehicle 5. The exact locations of the sensor devices 2 are variable, but in this schematic diagram, the rear sensor device 2 may be situated in a rear bumper, and the side sensor devices 2 may be situated in the respective side mirrors.

As further shown in FIG. 6, the sensor devices 2 may have partially overlapping fields of view 14. The field of view of each side sensor device 2 may overlap with the field of view of the rear sensor device 2, such that the entire viewing area of interest is included within the fields of view of the plurality of sensor devices 2. Further, the fields of view 14 of the sensor devices 2 may cover part or all of the vehicle surrounding.

In the schematic diagram of FIG. 6, an obstruction 15, e.g. a light post, and another obstruction 16, e.g. a fire hydrant, are also shown. As can be seen by the fields of view 14 of the sensor devices 2, the light post 15 is not within the field of view 14 of any of the sensor devices 2, but the fire hydrant 16 is within the fields of view of two sensor devices 2. Accordingly, during the parallel parking maneuver, the fire hydrant 16 may be identified as an object of interest to the particular driving situation, whereas the light post 15 may not be identified as such. Thus, when the system 1 renders and displays the three-dimensional environment map 6 to the driver, the processor 4 may highlight the fire hydrant 16 as an object of interest to the particular driving situation. Moreover, although the light post 15 may be physically closer to the host vehicle 5, the processor 4 may not highlight the light post 15, as it is not identified as an object of interest to the particular driving situation.

FIGS. 4 and 5 show example embodiments of the three-dimensional environment map 6 during a parallel parking maneuver, and FIG. 6 shows a schematic diagram of a top view of a host vehicle 5, also during a parallel parking maneuver. However, points of view other than those shown in FIGS. 4 to 6 are also possible, and different points of view may be more beneficial to different particular driving situations.

Figure 7:
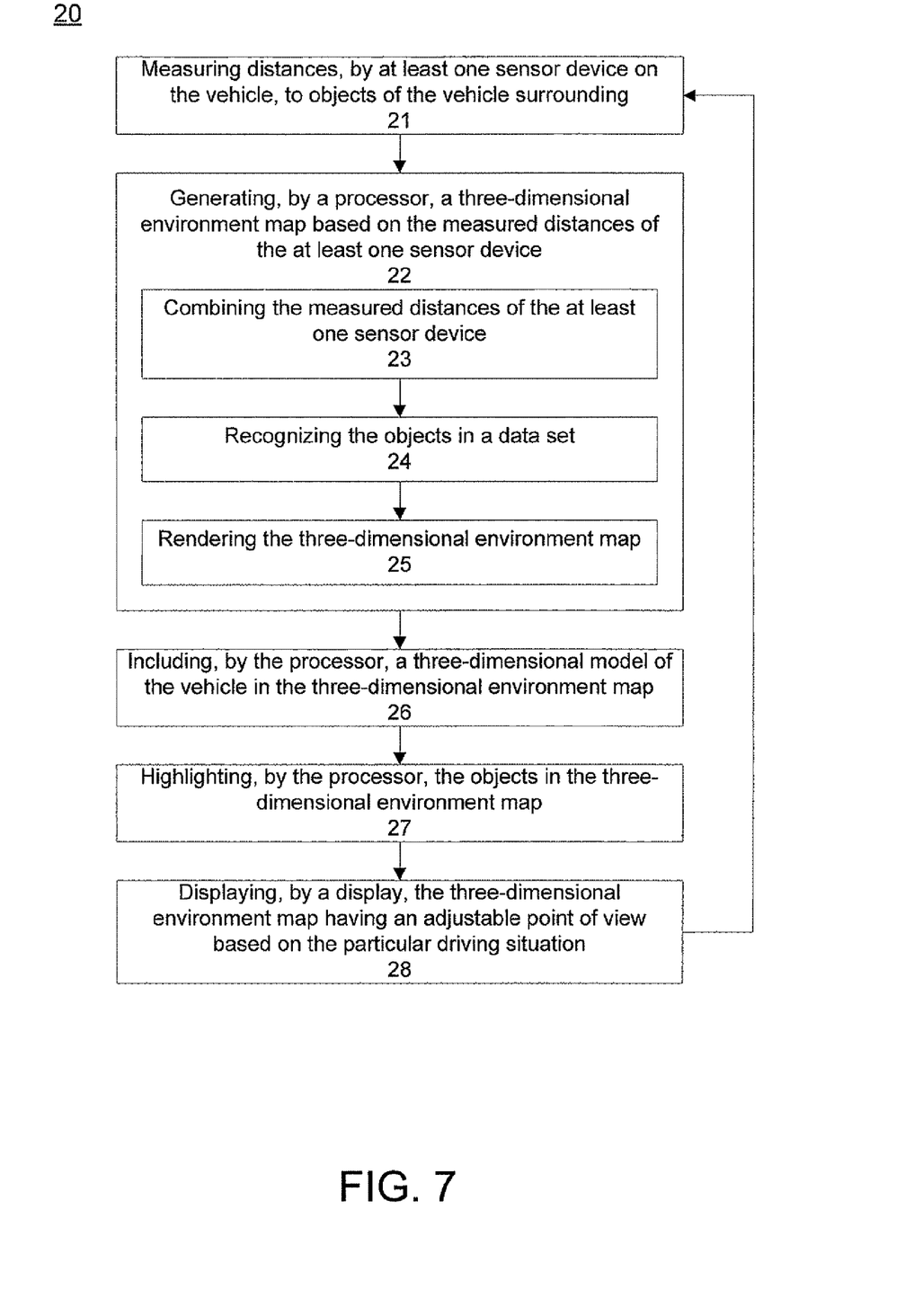
FIG. 7 is a schematic flow diagram of a method for displaying a vehicle surrounding with an adjustable point of view.

FIG. 7 shows a schematic flow diagram of a method 20 for displaying a vehicle surrounding with an adjustable point of view.

Action 21 includes measuring distances, by at least one sensor device 2 on the vehicle, to objects of the vehicle surrounding. These measured distances 3 are provided to a processor 4.

Action 22 includes generating, by the processor 4, a three-dimensional environment map 6 based on the measured distances 3 of the at least one sensor device 2. Action 22 may further include the Action 23, 24, and 25. Additional processing action may also be included, such as noise filtering and contrast enhancement, for example.

Action 23 includes combining the measured distances 3 of the at least one sensor device 2 into a single set of data. During this action 23, the processor 4 may also take into consideration many factors, such as the geometries of the fields of view 14 of the sensor devices 2, the mounting positions of the sensor devices 2, the orientation of the sensor devices 2, and others.

Action 24 includes recognizing the objects in a data set by comparing them to a data set of potential objects of interest. During this action 24, the processor 4 may determine which objects to render for view in the three-dimensional environment map 6.

Action 25 includes rendering the three-dimensional environment map 6 based on the measured distances 3 that were combined in step 23 and based also on the objects that were recognized in action 24.

Action 26 provides including, by the processor 4, a three-dimensional model 5 of the vehicle in the three-dimensional environment map 6. This may further assist a driver in understanding the three-dimensional environment map 6. In addition, the three-dimensional model 5 of the host vehicle may be specific to the particular design of the host vehicle.

Action 27 includes highlighting, by the processor 4, the objects in the three-dimensional environment map 6. During this action 27, the processor 4 may determine which objects to possibly highlight based on the measured distances 3 to objects in the three-dimensional environment map 6. For example, the processor 4 may determine which objects to possibly highlight based on the particular driving situation.

Action 28 includes displaying, by a display 7, the three-dimensional environment map 6 having an adjustable point of view based on the particular driving situation.

Further, as shown by the return loop from action 28 back to action 21, the processor 4 may continuously update the three-dimensional environment map 6 as the vehicle moves and/or as objects in the vehicle surrounding move.

What is claimed is:

1. A system for displaying a vehicle surrounding with an adjustable point of view, comprising:
   at least one sensor device on the vehicle, the at least one sensor device configured to measure distances to objects of the vehicle surrounding;
   a processor configured to generate a three-dimensional environment map based on the measured distances of the at least one sensor device; and
   a display configured to display the three-dimensional environment map having an adjustable point of view based on a particular driving situation.

2. The system according to claim 1, wherein the adjustable point of view includes a point of view other than that of the at least one sensor device.

3. The system according to claim 2, wherein the adjustable point of view includes a point of view most beneficial to the particular driving situation.

4. The system according to claim 3, wherein the point of view most beneficial to the particular driving situation includes a point of view, during a parallel parking situation, from at least one of a side and a rear of the vehicle.

5. The system according to claim 1, wherein the processor is configured to continuously update the three-dimensional environment map.

6. The system according to claim 1, wherein the at least one sensor device includes at least one of: (a) a time-of-flight, (b) lidar, (c) radar, (d) ultrasound, and (e) stereo sensor device.

7. The system according to claim 1, wherein the processor is configured to highlight the objects in the three-dimensional environment map based on the measured distances to the objects.

8. The system according to claim 1, wherein the processor is configured to highlight the objects in the three-dimensional environment map based on the particular driving situation.

9. The system according to claim 1, wherein the display is configured to display an indication of the measured distances to the objects on the three-dimensional environment map.

10. The system according to claim 1, wherein the at least one sensor device includes a plurality of sensor devices with at least partially overlapping fields of view.

11. The system according to claim 10, wherein the plurality of sensor devices includes a sensor device mounted on a rear of the vehicle and a sensor device mounted on each side of the vehicle.

12. The system according to claim 1, wherein the processor is configured to perform sensor fusion, object recognition, and scene rendering.

13. The system according to claim 12, wherein the processor is configured to perform noise filtering and contrast enhancement.

14. The system according to claim 1, wherein the processor is configured to include a three-dimensional model of the vehicle in the three-dimensional environment map.

15. A method for displaying a vehicle surrounding with an adjustable point of view, comprising:
    measuring distances, by at least one sensor device on the vehicle, to objects of the vehicle surrounding;
    generating, by a processor, a three-dimensional environment map based on the measured distances of the at least one sensor device; and
    displaying, by a display, the three-dimensional environment map having an adjustable point of view based on a particular driving situation.

16. The method according to claim 15, wherein displaying the three-dimensional environment map includes displaying from a point of view other than that of the at least one sensor device.

17. The method according to claim 15, wherein displaying the three-dimensional environment map includes displaying from a point of view most beneficial to the particular driving situation.

18. The method according to claim 17, wherein displaying from the point of view most beneficial to the particular driving situation includes displaying from a point of view, during a parallel parking situation, from at least one of a side and a rear of the vehicle.

19. The method according to claim 15, further comprising continuously updating, by the processor, the three-dimensional environment map.

20. The method according to claim 15, further comprising highlighting, by the processor, the objects in the three-dimensional environment map based on the measured distances to the objects.

21. The method according to claim 15, further comprising highlighting, by the processor, the objects in the three-dimensional environment map based on the particular driving situation.

22. The method according to claim 15, further comprising displaying, by the display, an indication of the measured distances to the objects on the three-dimensional environment map.

23. The method according to claim 15, further comprising measuring distances by a plurality of sensor devices with at least partially overlapping fields of view.

24. The method according to claim 23, further comprising measuring distances by the plurality of sensor devices including one sensor device mounted on a rear of the vehicle, and one sensor device mounted on each side of the vehicle.

25. The method according to claim 15, wherein the generating includes:
   combining, by the processor, the measured distances of the at least one sensor device;
   recognizing the objects in a data set; and
   rendering the three-dimensional environment map.

26. The method according to claim 25, wherein the generating includes:
   filtering noise; and
   enhancing contrast.

27. The method according to claim 15, further comprising including, by the processor, a three-dimensional model of the vehicle in the three-dimensional environment map.

* * * * *